United States Patent [19]
Wiese

[11] 3,899,095
[45] Aug. 12, 1975

[54] DOOR CLOSING ASSEMBLY FOR MATERIAL HANDLING SYSTEMS

[75] Inventor: Delmar R. Wiese, Blue Springs, Nebr.

[73] Assignee: Hoover Ball and Bearing Company, Saline, Mich.

[22] Filed: Dec. 17, 1973

[21] Appl. No.: 425,110

[52] U.S. Cl. .................. 214/302; 214/307; 222/185
[51] Int. Cl. .............................................. B67d 5/06
[58] Field of Search ............ 214/302, 307, 314, 63, 214/54; 222/185, 504, 556; 220/32; 49/340; 141/317, 321, 357

[56] References Cited
UNITED STATES PATENTS

| | | | |
|---|---|---|---|
| 2,790,493 | 4/1957 | Wenzelberger ..................... | 222/504 |
| 3,198,395 | 8/1965 | McKinney ........................... | 222/181 |
| 3,429,782 | 2/1969 | Hicks et al. ......................... | 222/504 |
| 3,729,121 | 4/1973 | Cannon ............................... | 214/307 |

Primary Examiner—Frank E. Werner
Assistant Examiner—Lawrence J. Oresky
Attorney, Agent, or Firm—Olsen and Stephenson

[57] ABSTRACT

Door closing assemblies for material handling systems wherein a bin having a discharge opening and a hinged door movable between closed and open positions with respect to the discharge opening is moved to a discharge position engaged with a receiving hopper so that the bin discharge opening is in registry with an inlet opening in the receiving hopper. The bin door is arranged so that the weight of the bin contents constitutes a force tending to move the door to the open position and fluid actuated extensible means are provided in the hopper and are engaged with the door so as to enable closing of the door prior to complete discharge of the bin contents and also to enable use of the door to regulate the rate of material flow from the bin.

3 Claims, 5 Drawing Figures

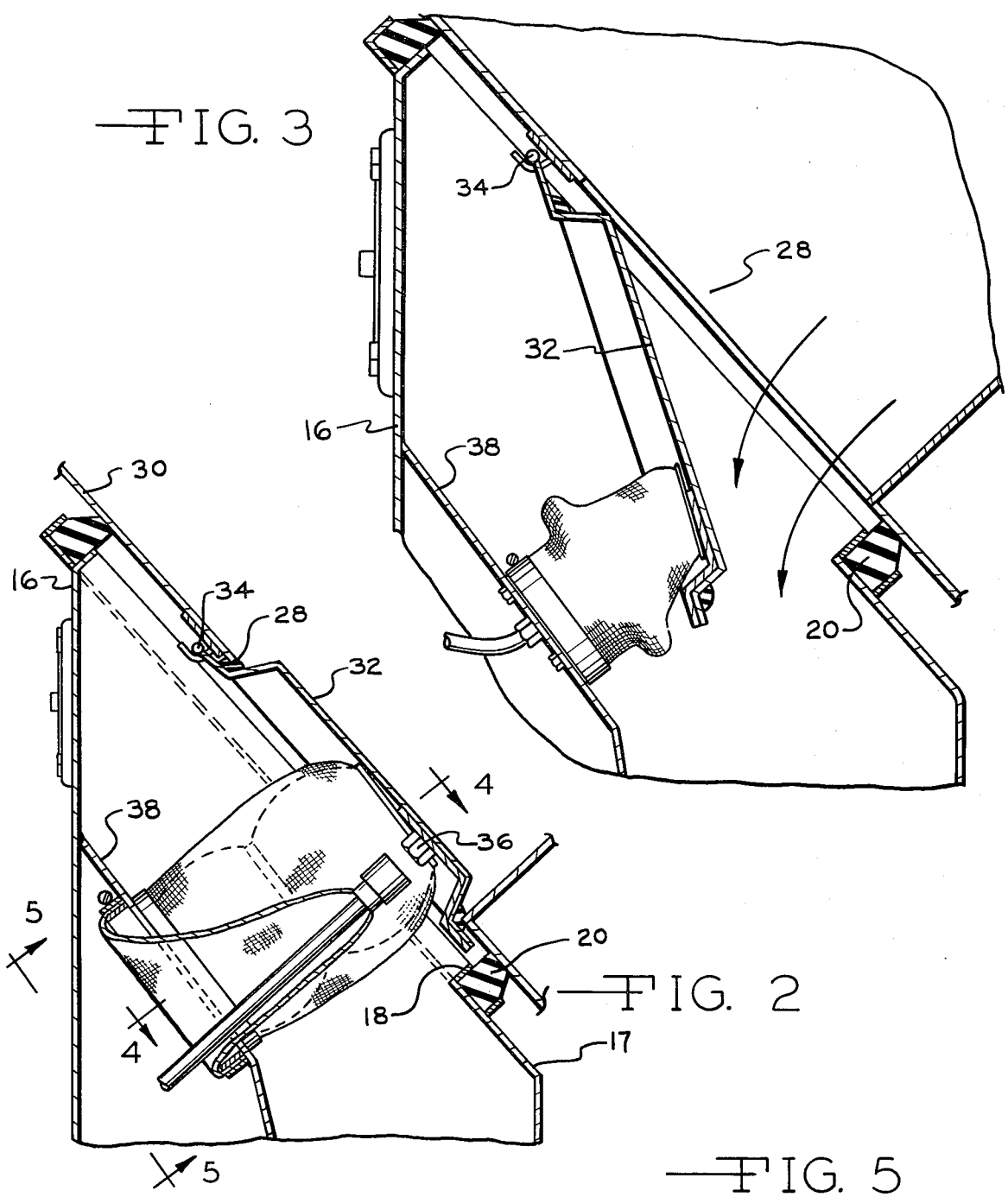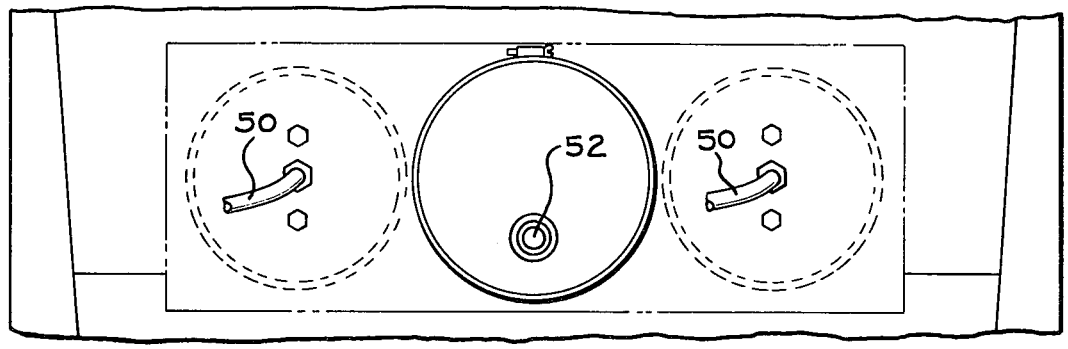

DOOR CLOSING ASSEMBLY FOR MATERIAL HANDLING SYSTEMS

BACKGROUND OF THE INVENTION

It is relatively common in the bulk material handling field, wherein it is necessary to move granular materials from one point to another, to utilize bins with side wall discharge openings having hinged doors that close the openings during transport of the bins. When it is desired to discharge the bin contents, the bin is moved to a forwardly tipped position in which the weight of the bin contents constitutes a force tending to open the bin door. The bin is moved to a position in which the bin front wall engages a material receiving hopper that has an inlet opening positioned in registry with the bin discharge opening. The bin door is then opened so that the bin contents flow, under the force of gravity, into the receiving hopper. A conveyor of some type may be conventionally associated with the hopper for transporting material therein to another point.

In such a system, the bin contents continuously interfere with closing of the bin door prior to complete discharge of the bin. In other words, it is virtually impossible to manually close the door against the force of material flowing out of the bin. Thus, in the past, it has been necessary to fully discharge the bin before removing it from its position engaged with the hopper if spillage of the bin contents is to be avoided. Many mechanisms capable of providing the necessary force on the bin door to close it against the weight of the bin contents have been considered. However, since there is considerable dust associated with the flow of granular material from the bin into the hopper, any door closing mechanism that involves forming one or more openings in the hopper in order to gain access to the open bin door are objectionable because they create the possibility for release of objectionable dust from the hopper during discharge of the bin contents. Heretofore, therefore, no suitable solution to the problem of partial bin discharge has been available.

The principal object of the present invention, therefore, is to provide an improved door closure assembly for material handling systems of the above type which enables partial bin discharge without creating a consequent dust problem.

SUMMARY OF THE INVENTION

In the material handling systems to which this invention relates, a pair of fluid actuated bellows members are mounted on the back wall of the material receiving hopper so that the bellows can be extended into engagement with the discharge door of a bin in discharging position relative to the hopper. A latch actuating member, associated with a protective dust tight sleeve, can be moved between the bellows members into engagement with the door latch assembly so as to unlock the door. The bin is then discharged by releasing fluid from the bellows members so that the weight of the bin contents on the door will force the door rearwardly to compress the bellows members and open the door. Discharge of material from the bin then proceeds to the point where the bin is either partially or fully empty, as desired. When it is desired to close the bin door, and perhaps terminate discharge of material from the bin, fluid is directed to the bellows members in sufficient quantity to cause the bellows members to extend sufficiently to move the door back to its closed position. The latch actuating member is then used to latch the door. the bin can then be removed from its position engaged with the hopper without spillage of the bin contents.

It can thus be seen that the door closing apparatus of this invention enables partial discharge of the bin contents without spillage or the creation of a dust problem and also enables regulation of the rate of flow of material from the bin.

Further objects, features and advantages of this invention will become apparent from a consideration of the following description, the appended claims, and the accompanying drawing in which:

FIG. 2 is a fragmentary sectional view through a portion of the discharge station shown in FIG. 1 illustrating the bin door in closed position;

FIG. 3 is a sectional view, like FIG. 2, showing the bin door in open position;

FIG. 5 is a fragmentary view of the discharge station from substantially the line 5—5 in FIG. 2.

Figure 4:
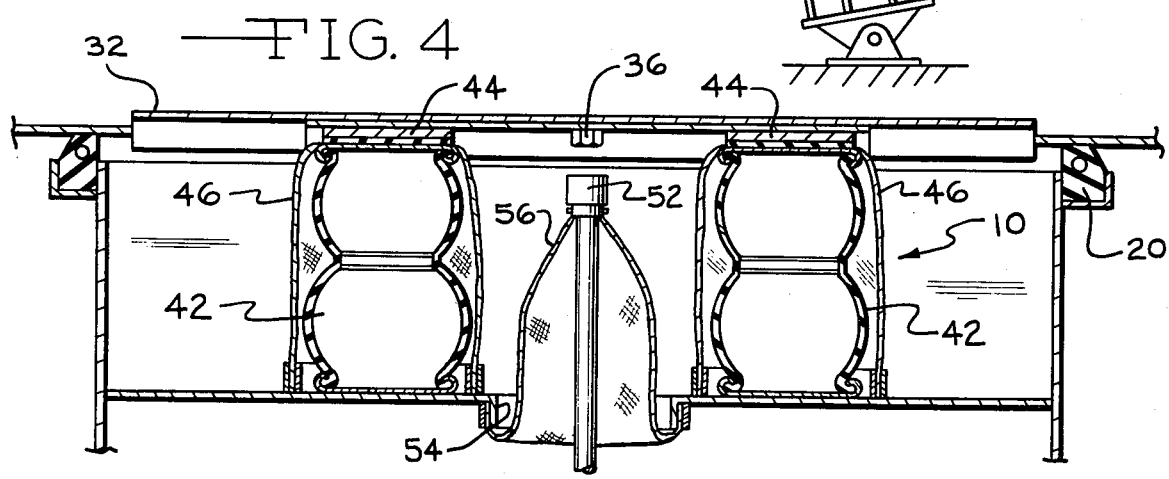
FIG. 4 is a transverse sectional view of the discharge station as seen from substantially the line 4—4 in FIG. 2.

With reference to the drawing, the door closing assembly of this invention, indicated generally at 10 in FIG. 4, is illustrated in a material handling system 12 (FIG. 1) which includes a discharge station 14 consisting of a stationary hopper 16 having an inclined front wall 17 in which an inlet opening 18 is located. A gasket 20 defines the boundary of the opening 18 and a conventional conveyor assembly 21 is shown for receiving material from the hopper 16 although it is to be understood that in some installations such a conveyor is omitted. A bin 22 is mounted on a tipping mechanism 24 capable of moving the bin from a loading position shown in broken lines to a tipped discharge position shown in solid lines. In the tipped position of the bin 22, a discharge opening 28 (FIGS. 2 and 3) in the bin front wall 30 is in registry with the hopper opening 18. The bin 22 has a door 32 mounted on a hinge mechanism 34 on the bin front wall 30 so that the door 32 can move between the closed and open positions shown in FIGS. 2 and 3. The door 32 carries a conventional latch mechanism, a portion of which is shown at 36, which is operable to lock the door in the closed position shown in FIG. 2. The latch mechanism is locked and released by rotating the portion 36.

Figure 1:
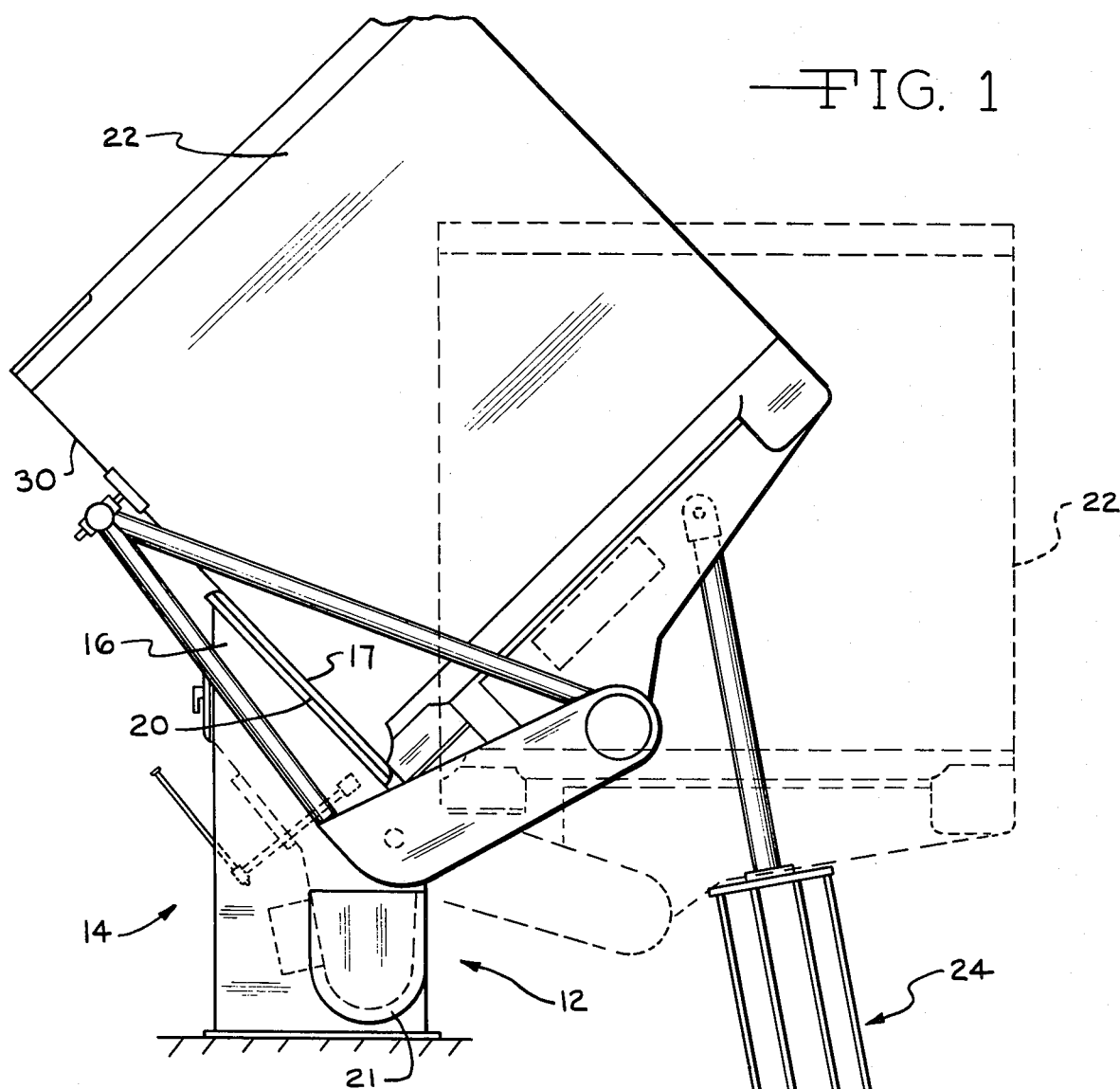
FIG. 1 is a side elevational view of a bulk material discharge station showing a bin in discharge position in solid lines and in loading and unloading position in broken lines.

In the system 12, when the bin 22 is to be discharged, it is tipped to the position shown in solid lines in FIG. 1 in which the bin front wall 30 is engaged with the hopper 16 at a position in which the bin discharge opening 28 is in registry with the bin inlet opening 18. As shown in FIG. 3, the bin door 32 is of substantially smaller size than the hopper inlet opening 18 so that the door 32 can hinge to an open position within the hopper 16 at a position generally between an inclined portion 38 of the hopper back wall and the similarly inclined front wall 17. As shown in FIGS. 2 and 3, the walls 17 and 38 are substantially parallel.

The door closing assembly 10 consists of a pair of extensible bellows members 42 that are mounted on the hopper rear wall 38 and are provided at their free ends with metal reinforcing plates 44 engageable with the bin door 32. A protective dust tight sleeve 46 is provided for each bellows member 42, the sleeve 46 being mounted at one end on the hopper wall 38 and being secured at the other end to the free end of the bellows member. Each cover 46 thus protects a bellows member 42 from contamination from the material in the hopper 16.

In the use of the closing assembly 10, assume that the bin door is in the closed position shown in FIG. 2 and that the bellows members 42 are extended into engagement with the door as shown in FIG. 2. Each bellows member is provided with a fluid inlet line 50 (FIG. 5) through which fluid can be admitted to the bellows 42 so as to maintain it in an extended position holding the door 32 closed. When it is desired to open the door 32, a latch actuating member 52 is extended through a hopper opening 54 into engagement with the latch portion 36. As shown in FIG. 4, a protective sleeve 56, of dust tight character, is connected to the hopper wall 38 and to the latch actuating member 52 so as to preclude escape of dust through the opening 54 when the door 32 is being opened. After the actuating member 52 is used to unlatch the door 32 by rotating the latch portion 36, a conventional control valve mechanism (not shown) connected to the fluid lines 50, is manipulated so as to provide for a slow release of fluid from the bellows members 42 so that the members 42 will contract in response to the force of the door 32 on the bellows members 42. The weight of the contents of the bin 22 constitutes a force on the door 32 causing it to open. When the door 32 is open to the position shown in FIG. 3 or in any other open position, the flow of fluid out of the bellows members 42 is discontinued and the door 32 is held in the open position by the bellows members 42.

When it is desired to discontinue the discharge of material from the bin 22 either because the bin is empty or because it is desired to only partially empty the bin 22, the control valve is manipulated to provide for a flow of fluid under pressure through the lines 50 into the bellows members 42. This fluid extends the bellows members 42 so as to return the door 32 to its closed position shown in FIG. 2. The latch actuating member 52 is then engaged with the latch 36 and manipulated so as to lock the door 32 in its closed position. The tilting mechanism 24 can then be operated to return the bin 22 to its unload position shown in broken lines in FIG. 1 without spillage of material from the bin 22.

From the above description, it is seen that this invention provides a door closing assembly 10 for a material handling system 12 which enables partial discharge of the contents of the bin 22 without creating spillage and dust problems. These sought after objectives are obtained by virtue of the provision of the bellows members 42 for moving the bin door 32 between its open and closed positions. This is accomplished without the requirement for openings in the hopper 16 through which material could be spilled and dust could escape. In addition, the flexible sleeve enclosed latch actuating member 52 enables latching and unlatching of the bin door 32 without dust and spillage.

What is claimed is:

1. In a material handling system which includes a material receiving hopper having a rear wall and a front wall formed with an inlet opening, a bin having a discharge opening and a door hinged at the upper end thereof so that it is pivotally movable between closed and open positions with respect to said discharge opening, said bin being positioned against said hopper front wall so that said bin discharge opening is in registry with said hopper inlet opening and said bin door can pivot to open positions in which said door extends into said hopper, extensible means mounted on said hopper back wall and engaged with said bin door below said hinged upper end thereof when said door is in said closed position, said extensible means being retractable away from said hopper front wall while continuously engaged with said bin door to thus enable said door to pivot from said closed position to a plurality of open positions in which said door is moved varying distances away from said discharge opening so that the extent of opening of said door can be used to control the rate of flow of material from said bin into said hopper, said extensible means being extendable toward said hopper front wall while engaged with said bin door to thereby move said door toward said closed position thereof said hopper front wall being inclined downwardly and forwardly and said bin door being similarly inclined downwardly and forwardly in the closed position thereof so that the weight of the bin contents will constitute a force tending to move the door to its open position, and the portion of said hopper back wall on which said extensible means is mounted being substantially parallel to said front wall, said extensible means being substantially perpendicular to said bin door in the closed position thereof so that the closing force applied to said door by said extensible means is likewise substantially perpendicular to said door in the closed position thereof.

2. The invention set forth in claim 1 wherein said extensible means comprises a pair of side by side bellows members engaged with horizontally spaced portions of said door and further including protective cover members secured to said back wall and enclosing said bellows members to prevent contact therewith of particles of material in said hopper.

3. The invention according to claim 2 further including reinforcing plates on said bellows members engageable with said door.

* * * * *